United States Patent
Bosser

(10) Patent No.: US 6,604,519 B1
(45) Date of Patent: Aug. 12, 2003

(54) GAS APPARATUS FOR HEATING AND/OR COOKING FOOD

(75) Inventor: Michel Bosser, Pouldreuzic (FR)

(73) Assignee: Krampouz, Pluguffan (FR)

( * ) Notice: Subject to any disclaimer, the term of this patent is extended or adjusted under 35 U.S.C. 154(b) by 0 days.

(21) Appl. No.: 09/763,634
(22) PCT Filed: Sep. 8, 1999
(86) PCT No.: PCT/FR99/02139
§ 371 (c)(1), (2), (4) Date: Jun. 5, 2001
(87) PCT Pub. No.: WO00/13562
PCT Pub. Date: Mar. 16, 2000

(30) Foreign Application Priority Data

Sep. 8, 1998 (FR) .............................................. 98 11387

(51) Int. Cl.⁷ ................................................. F24C 3/08
(52) U.S. Cl. ................................... 126/39 J; 126/39 R
(58) Field of Search .............................. 126/39 J, 39 H, 126/39 R; 239/555, 558

(56) References Cited

U.S. PATENT DOCUMENTS

| 1,788,752 A | * | 1/1931 | Thornton | .................... 126/39 J |
| 3,844,270 A | * | 10/1974 | Black | ...................... 126/110 R |
| 4,108,142 A | | 8/1978 | Barson et al. | |
| 4,264,298 A | | 4/1981 | Simeoni | |
| 5,131,320 A | * | 7/1992 | Jensen et al. | .................. 99/376 |
| 5,295,476 A | * | 3/1994 | Herbert | ...................... 126/39 G |
| 5,865,100 A | | 2/1999 | Knowles | |
| 6,299,436 B1 | * | 10/2001 | Huang | ........................ 126/39 R |
| 6,318,993 B1 | * | 11/2001 | Huang | ........................ 126/39 R |

FOREIGN PATENT DOCUMENTS

| AU | 28413/84 | | 11/1985 |
| FR | 2 677 109 | * | 5/1992 |
| WO | WO 96/06304 | * | 2/1996 |
| WO | WO 99/20942 | | 4/1999 |

OTHER PUBLICATIONS

Patent Abstract of Japan, vol. 98, No. 11, Sep. 30, 1998, JP 10 165313, Chubu Corp. KK Jun. 1998.

* cited by examiner

Primary Examiner—Alfred Basichas
(74) Attorney, Agent, or Firm—Jacobson Holman PLLC

(57) ABSTRACT

A gas apparatus for heating and/or cooking food. The apparatus includes a housing having a lower body where a gas/air mixture to burnt is received and a top part in the form of a plate designed to be urged to rest on the body. Orifices are provided in the housing for the outflow and combustion of the gas/air mixture. The plate's upper surface forms a surface for receiving food to be heated and/or cooked, and the housing has a sinuous outline with radial branches arranged such that the outflow and combustion of the gas/air mixture take place in the central, peripheral and radial zones of the surface beneath the top part.

13 Claims, 4 Drawing Sheets

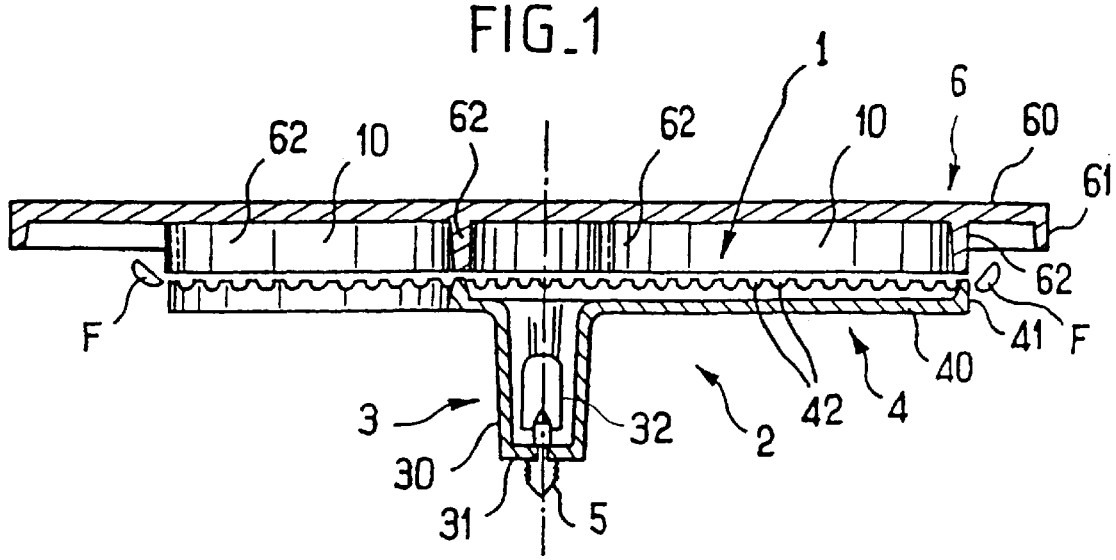
FIG_1
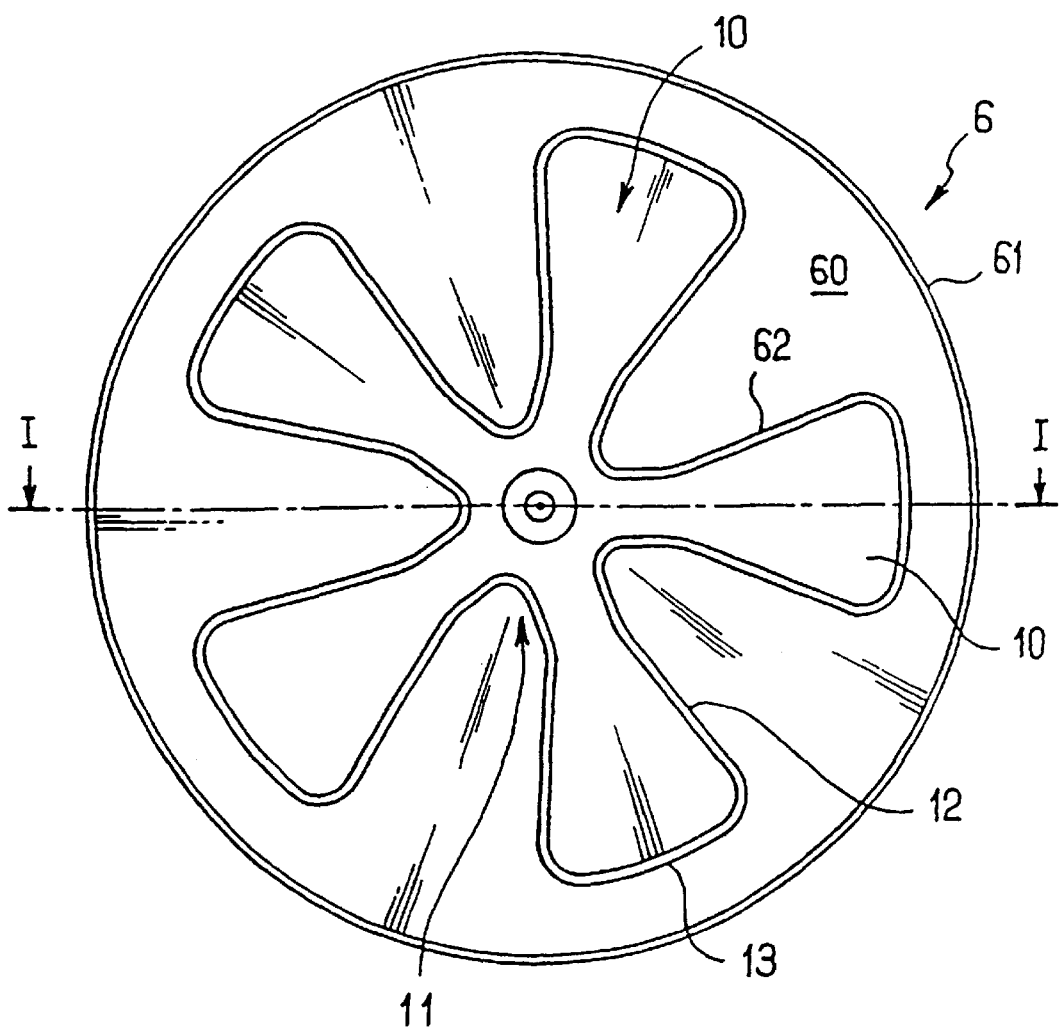
FIG_2

FIG_3
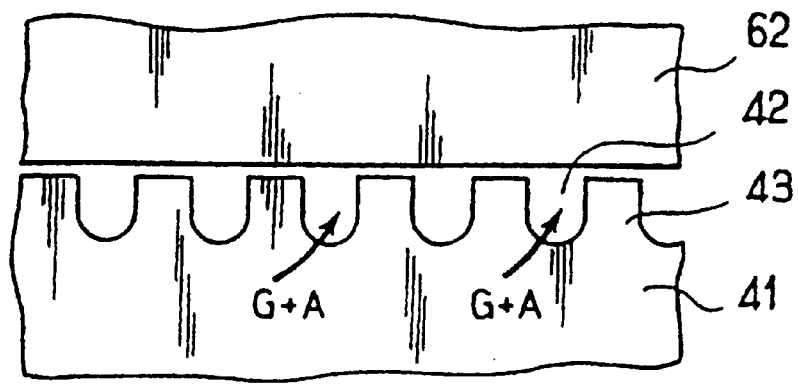
FIG_4
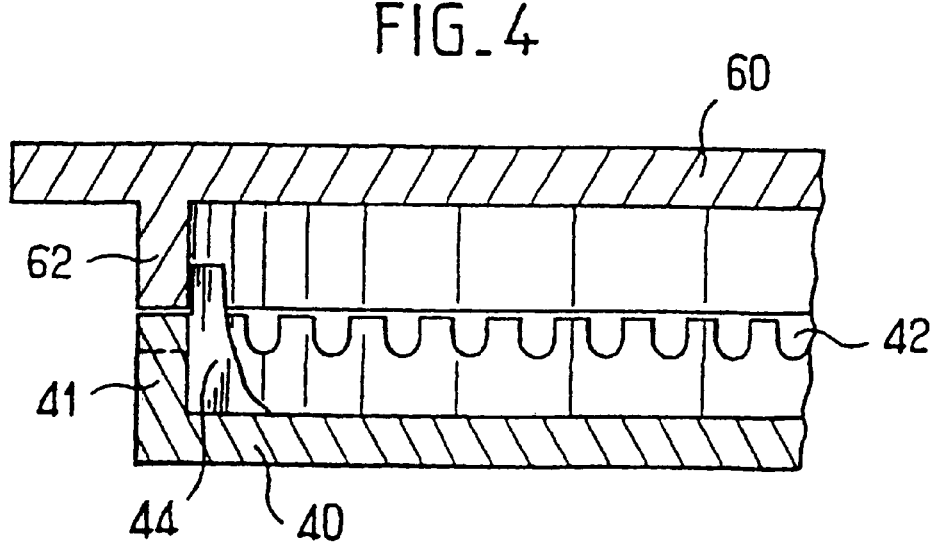
FIG_5
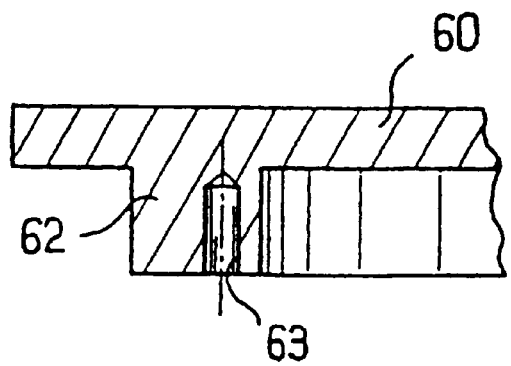

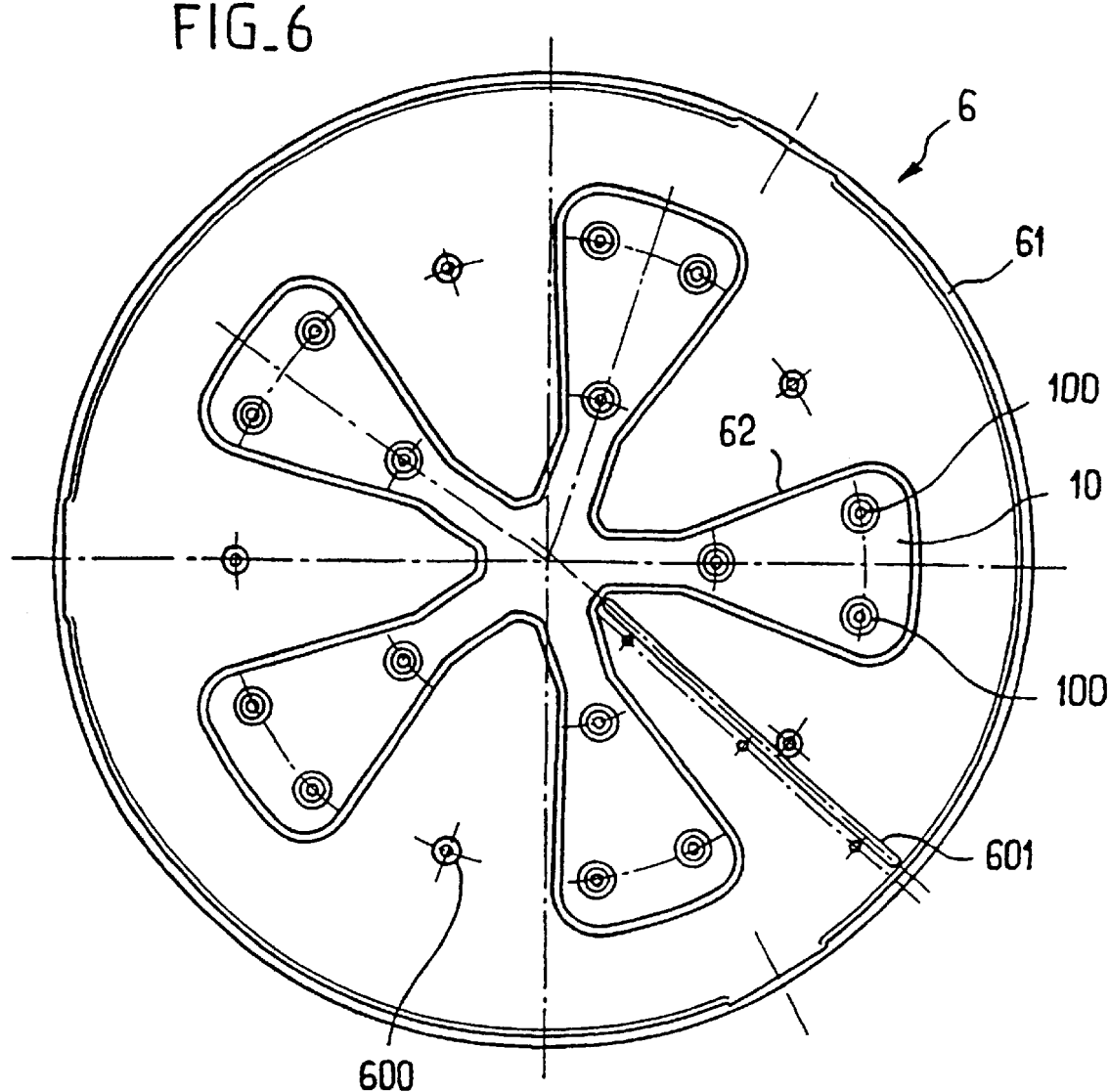
FIG_6
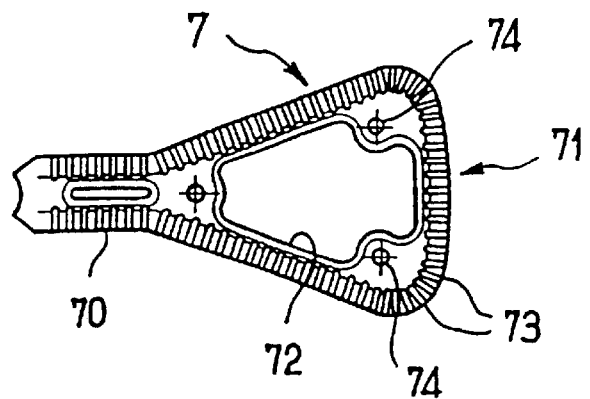
FIG_7

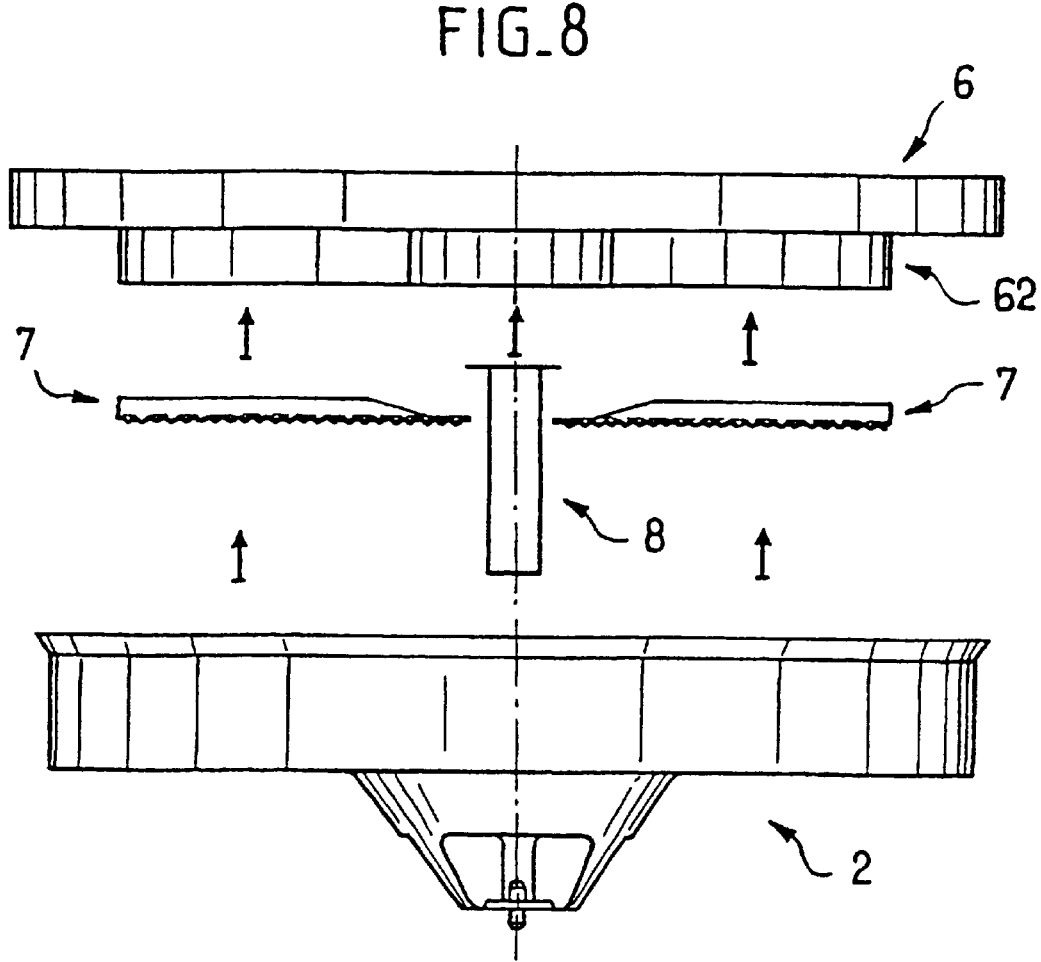
FIG_8
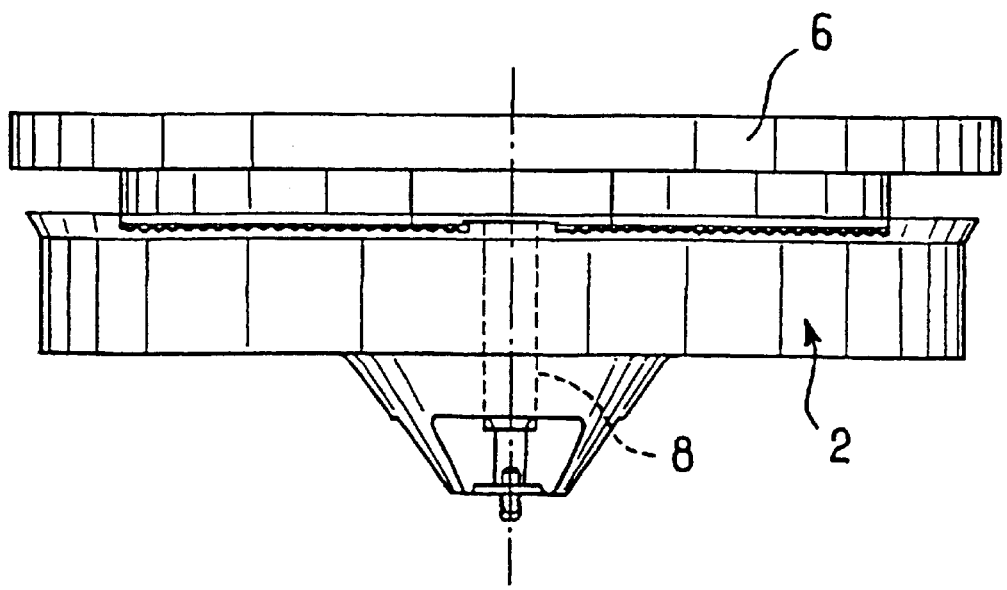
FIG_9

GAS APPARATUS FOR HEATING AND/OR COOKING FOOD

The present invention relates to a gas appliance for heating and/or cooking food.

Traditionally, in order to heat and/or cook food deposited on or in a food-receiving element such as a grill plate or a receptacle, said element is placed above a burner and, more precisely, on a series of support lugs extending horizontally above and in the immediate vicinity of the burner.

In certain embodiments, the receptacle stands directly on the burner.

Thus, Document U.S. Pat. No. 4,264,298 describes a gas burner whose cap is enlarged to form a plane head resembling a hot plate. The flames form at the periphery of a central chamber of small size. Combustion takes place outside said chamber and the flames come into contact with the under-face of the head. For this purpose, the flames are large, which results in large heat loss at the flame tips, giving brightness that is high but that is unnecessary.

In any event, such a configuration does not make it possible to heat the plate uniformly, especially when it is of large size.

In addition, the plate is designed to receive a cooking receptacle.

In spite of the proximity of the flame and of the receptacle, the energy is not transmitted fully to said receptacle. Additional heat losses occur between the flame and the inside of the receptacle.

When the food-receiving element has a large area to be heated, as it does when it is a pancake cooker plate, the structure of known burners is much more complex.

Thus, pancake cooker burners are known that comprise series of parallel and horizontal tubes through which a gas/air mixture flows, which tubes are provided with holes through which the combustion flames are released.

Others each have a central hub for receiving a gas/air mixture, which hub communicates with a set of branches distributed in a star shape, perpendicularly to the hub. Multiple holes are provided in said branches.

In those two types of burner, the pancake cooker plate is separate and is mounted above the burner, and, as in the preceding configuration, that gives rise to large heat losses between the burner and the support or food-receiving element.

In addition, such burners are complicated and costly to manufacture.

An object of the present invention is to remedy the drawbacks suffered by those known devices.

In other words, an object of the present invention is to provide a gas appliance whose heat losses are small, and that makes it possible to heat and/or cook food uniformly, even when it is deposited on a support that is large in size.

Another object of the present invention is to achieve the above-mentioned objects with an appliance whose structure is simple and inexpensive.

The invention thus provides a gas appliance for heating and/or cooking food, said appliance being characterized essentially by the facts that it includes a housing comprising a bottom body receiving a gas/air mixture to be burnt, and a top cover in the form of a plate designed to rest on said body, orifices being provided in said housing, through which orifices the gas/air mixture can be released and burnt, that the top face of said plate constitutes a surface for receiving food to be heated and/or to be cooked, and that the housing has a sinuous outline with radial branches, organized so that said gas/air mixture is released and burnt in central regions, peripheral regions, and radial regions of the under-face of the cover.

Thus, the food-receiving surface is in direct contact with the flame, so that the heat losses are small.

In addition, a single housing suffices to feed the entire appliance with the gas/air mixture.

Furthermore, since the food-receiving element is implemented in one piece with the cover, the cost of the assembly is advantageous and it is relatively simple to manufacture.

Finally, because of the sinuous outline of the housing, the flames are distributed uniformly over a large portion of the under-face of the cover. They can therefore be of small size, which improves their energy efficiency.

According to advantageous but non-limiting characteristics of the invention:

a wall having a closed and sinuous outline projects from the under-face of the cover, which wall comes into abutment on a low wall having the same outline and situated on the bottom body, said wall and said low wall defining said housing laterally;

the under-face of said cover comes into abutment directly on a low wall having a closed and sinuous outline and situated on the bottom body;

said plate is a pancake cooker plate;

said plate is a grill plate which may be ribbed or otherwise;

said release orifices extend in the vicinity of the junction plane on which the bottom body meets said cover;

said orifices consist of a series of notches formed in the top edge of said low wall, whose top openings are closed off by said cover;

said orifices consist of a series of notches formed in the bottom edge of said wall or in the body thereof;

said orifices consist of a series of notches formed in an intermediate piece suitable for being interposed between said wall and said low wall; and the outline of said housing has a shape similar to the shape of a star.

other characteristics of the invention will appear on reading the following description of embodiments. This description is given with reference to the accompanying Figures, in which:

FIG. 1 is a right section view of an appliance of the present invention;

FIG. 2 is a view from underneath the cover equipping the appliance of FIG. 1, showing the section plane I—I of FIG. 1;

FIG. 3 is a detail view of a portion of the body and of the cover of the appliance of FIG. 1, showing the shape and the distribution of gas/air mixture release orifices;

FIG. 4 is also a detail view of a portion of the body and of the cover of the appliance on a vertical section plane, showing the presence of centering studs;

FIG. 5 is yet another detail view on a vertical section plane of the cover, in a region in which it is organized to receive a fixing screw;

FIG. 6 is a view from underneath the cover equipping an appliance of the invention, in a second embodiment;

FIG. 7 is a view from underneath a gas/air mixture transfer stage designed to co-operate with the cover of FIG. 6;

FIG. 8 is an exploded side view of an appliance equipped with the cover of FIG. 6 and with transfer stages as shown in FIG. 7; and FIG. 9 is a side view of the appliance of FIG. 8, after its various component elements have been assembled together.

The gas appliance shown in FIG. 1 comprises a housing 1 with a bottom body 2 in which the gas/air mixture to be burnt is received, and a top cover 6 in the form of a plate that rests on the body.

The body 2 is a piece that is made of metal, e.g. aluminum, and that is diecast. In a variant, it may be a piece made by stamping sheet metal.

It is provided with a central and axial well 3.

The well consists of a cylindrical piece, with a generally-vertical wall, and of a bottom 31. A gas injector 5 passes through the bottom 31 and has its dispensing head opening out axially into the well.

The wall 30 is provided with an air intake opening 32.

The well 3 is extended upwards by a tray 40 which extends horizontally and substantially parallel to the bottom of the well 31.

The tray 40 is edged by a low wall forming a peripheral lip 41 that projects perpendicularly upwards away from the well 3.

The tray 40 and the lip 41 co-operate to define the bottom portion of a flow chamber 4 for the gas/air mixture taken into the well.

The description below returns to the particular shape of this lip that participates in laterally defining the housing.

Along the top edge of the lip 41, a series of openings are provided that form U-shaped notches 42 that are uniformly spaced apart from one another. The notches constitute respective orifices through which the gas/air mixture taken into the chamber 4 is released and is burnt.

In an embodiment that is not shown, these notches are not spaced apart uniformly, and their respective sizes may differ. In any event, it is possible to consider any distribution of said notches that favors good flame behavior.

Naturally, these orifices are not necessarily provided at the top of the lip. They may be distributed in the body of the lip, at a lower level, i.e. without opening out onto its free top edge.

In the invention, the housing 1 includes a top cover 6 in the form of a plate designed to rest on the body 2.

In the example shown, it is a pancake cooker plate, i.e. it is a circular metal plate 60 whose top face serves to receive the food to be cooked.

The term "pancake cooker" is used to include not only an appliance serving to make sweet or savory pancakes or "crêpes", but also an appliance serving to cook any thick liquid batter or mixture, e.g. of the type used to make "blinis".

The under-face of the plate has a stiffening circular peripheral lip 61 which extends downwards over a small height.

A wall 62 having a closed outline and that extends over a larger height also extends downwards from said under-face. The height of this wall is, for example, approximately in the range 25 millimeters (mm) to 35 mm.

The sinuous shape of this wall is reminiscent of the shape of a star. The above-described lip 41 has exactly the same shape.

As shown in FIG. 1, the wall 62 serves to come into abutment on the low wall or lip 41. It co-operates with the plate portion 60 that it defines to constitute the top portion of the above-mentioned chamber 4.

It is around the periphery of this chamber that the flames F are distributed, as shown in FIG. 1.

In a different embodiment, the above-described notches may be provided in the bottom edge of the wall 62 or in the body of said wall.

The fact that the cover 6 of the housing is an integral part of the element for receiving the food to be cooked enables the heat to be distributed better, without any real loss of said heat.

The cover 6, with its plate 60 and its wall 62 cooperates with the body 2 and its lip 41 to define the housing 1 of the appliance.

Because of the particular shape of the wall 62 and of the lip 41, the housing has a sinuous outline, with radial branches 10.

These branches are organized so that the gas/air mixture is released and burns in the form of flames in central regions 11, peripheral regions 13, and radial regions 12 of the under-face of the cover 6.

The expression "central regions" is used to mean zones of the cover 6 that are close to its geometrical center. The expression "peripheral regions" is used to mean zones close to its peripheral rim. The expression "radial regions" is used to mean zones which generally extend from the geometrical center of the cover towards its peripheral rim. Naturally, these definitions are valid even if the plate lies within a geometrical shape other than a circle, e.g. a square.

It is this particular shape of the housing that makes it possible to distribute the combustion flames over the majority of the area of the cover 6, while using a single gas injector 5 only.

The plate 60 is preferably made of cast iron, with a thickness of in the range 8 mm to 10 mm. However, it may be made of glass or of any other high temperature resistant material.

By way of indication, the diameter of such a plate generally lies in the range 300 mm to 500 mm.

In an embodiment (not shown), the wall 62 may be omitted from the cover 6. In which case, said cover bears on the lip 41 directly via its under-face.

FIG. 3 is merely intended to show how the gas/air mixture G+A is released via the notches 42 provided in the lip 41 on the bottom body 2.

Centering studs may be provided at the bottom body to facilitate putting the cover in place.

Such a stud 44 is shown in FIG. 4. It edges the inside face of the lip 41 and it projects significantly above said lip. Thus when the cover is put in place, the inside face of the wall 62 comes into abutment against the stud 44.

In addition to said studs, fixing screws may be provided for fixing together the two portions of the housing. For this purpose, and with reference to FIG. 5, the above-mentioned wall 62 may include zones of larger thickness in which orifices 63 are provided for receiving self-tapping screws.

It should be noted that these fixing means are purely optional. It may be advantageous to provide a cover that can be removed merely by withdrawing it upwards, e.g. so as to facilitate cleaning it or replacing it with another cover.

While retaining the above-indicated advantages, the housing serving to distribute the gas over the under-face of the plate may be obtained by various techniques that are in common use in the art.

In the embodiment shown in FIG. 6, the cover 6 has substantially the same structure as the cover shown in FIG. 2.

It is made of cast iron, and it has five radial branches 10 distributed in a star shape and defined by a wall 62.

The number of branches may, in various embodiments, be higher or lower. Similarly, the branches may be of different shapes and sizes, in particular as a function of the dimensions or of the appearance of the plate.

Two distinct series of tapped studs 100 and 600 project from the under-face, the studs 100 being disposed in a triangular distribution inside the radial branches 10. Their height is substantially the same as the height of the wall 62.

The under-face is provided with a radial groove 601 whose function is to receive a temperature probe (not shown).

The cover is designed to receive pieces or stages 7 for transferring the gas/air mixture from the inside of the device to the outside.

One of the stages is shown in FIG. 7.

Five stages of the same type serve to bear against the above-mentioned radial branches 10. The stages are of outline analogous to the shape of the branches 10. Each of them has a body 70 and a head 71. By superposing the stages 7 and the wall 62, a housing 1 is obtained analogous to the housing described above.

The entire periphery of each stage is provided with a series of undulations 73 that define orifices in which the flames form.

A series of perforations 74 are provided in a manner such as to be superposed on the above-mentioned tapped studs to enable them to be fixed. Stamped side sections 72 stiffen the stages.

In another embodiment, the stages may be strictly plane and free of undulations. In which case, a thin intermediate piece having a series of notches is sandwiched between the wall 62 and each of the stages 7.

Although they bear against the branches 10, the stages 7 hold in place a central venturi tube 8. This tube replaces the above-mentioned central well 3.

The bottom body 2 shown in FIGS. 8 and 9 constitutes a chamber that serves to prevent the heat from being radiated downwards.

On the stamped bottom portion of the body, a gas injector is disposed. It may be disposed directly at the bottom end of the venturi tube 8.

This bottom body structure 2 may, in a different embodiment, equip an appliance such as the appliance described with reference to FIG. 2.

What is claimed is:

1. A gas appliance for at least one of heating and cooking food, said appliance comprising:
    a housing having a bottom body for receiving a gas/air mixture to be burnt and a top cover resting on said bottom body, orifices in said housing for release of the gas/air mixture, the housing having a sinuous outline with radially extending branches, the top cover including a plate extending beyond the sinuous outline of the housing, a top face of said plate constituting a surface for receiving food to be heated or to be cooked, and the sinuous outline of the housing allowing said gas/air mixture to be burnt in central regions, peripheral regions and radial regions of an under-face of the top cover for heating of the top face of the plate.

2. The appliance according to claim 1, wherein a wall having a closed and sinuous outline projects from the under-face of the top cover, the wall comes into abutment with a low wall having a same outline as the wall and situated on the bottom body, said wall and said low wall defining said housing.

3. The appliance according to claim 1, wherein the under-face of said top cover comes into abutment directly with a low wall having a closed and sinuous outline and situated on the bottom body.

4. The appliance according to claim 1, wherein said plate is a pancake cooker plate.

5. The appliance according to claim 1, wherein said plate is a ribbed grill plate.

6. The appliance according to claim 2, wherein said orifices extend to a junction plate of the bottom body and said top cover.

7. The appliance according to claim 6, wherein said orifices consist of a series of notches formed in a top edge of said low wall, top openings of said notches are closed by said top cover.

8. The appliance according to claim 6, wherein said orifices consist of a series of notches formed in a bottom edge of said wall.

9. The appliance according to claim 6, wherein said orifices consist of a series of notches formed in an intermediate piece for interposition between said wall and said low wall.

10. The appliance according to claim 1, wherein an outline of said housing is in a shape of a star.

11. A gas appliance for heating or cooking of food, said appliance comprising
    a housing having a bottom body for receiving a gas/air mixture to be burnt and a top cover including a downwardly projecting portion resting on said bottom body,
    orifices provided in said housing, and
    a top face of said top cover receiving food to be heated, said top face of said top cover extending beyond the housing formed by said bottom body and said downwardly projecting portion of the top cover and the housing releasing said gas/air mixture in regions of an under-face of the top cover, said regions being spaced inwardly from a peripheral lip of said top face of said top cover, and wherein a first wall having a closed and sinuous outline forms said downwardly projecting portion extending from the top cover, said first wall comes into abutment with a second wall having a same outline and situated on the bottom body, said first wall and said second wall defining said housing.

12. The appliance according to claim 11, wherein said top cover is a pancake cooker plate.

13. The appliance according to claim 11, wherein said top cover is a ribbed grill plate.

\* \* \* \* \*